US012668652B2

(12) United States Patent
Noh et al.

(10) Patent No.: US 12,668,652 B2

(45) Date of Patent: Jun. 30, 2026

(54) POLYPROPYLENE RESIN COMPOSITION AND NON-WOVEN FABRIC PREPARED USING THE SAME

(71) Applicant: LG Chem, Ltd., Seoul (KR)

(72) Inventors: Kyung Seop Noh, Daejeon (KR); Heekwang Park, Daejeon (KR); Seong Min Chae, Daejeon (KR); Jihwa Ye, Daejeon (KR)

(73) Assignee: LG Chem, Ltd., Seoul (KR)

(*) Notice: Subject to any disclaimer, the term of this patent is extended or adjusted under 35 U.S.C. 154(b) by 313 days.

(21) Appl. No.: 18/267,926

(22) PCT Filed: Mar. 25, 2022

(86) PCT No.: PCT/KR2022/004251

§ 371 (c)(1),
(2) Date: Jun. 16, 2023

(87) PCT Pub. No.: WO2022/203463

PCT Pub. Date: Sep. 29, 2022

(65) Prior Publication Data

US 2024/0052074 A1 Feb. 15, 2024

(30) Foreign Application Priority Data

Mar. 26, 2021 (KR) ........................ 10-2021-0039665
Mar. 25, 2022 (KR) ........................ 10-2022-0037393

(51) Int. Cl.

*C08F 210/06* (2006.01)
*C08L 23/12* (2006.01)
*D04H 1/4291* (2012.01)

(52) U.S. Cl.

CPC ............ *C08F 210/06* (2013.01); *C08L 23/12* (2013.01); *D04H 1/4291* (2013.01);

(Continued)

(58) Field of Classification Search

CPC ...... D04H 1/4291; C08L 23/12; C08F 210/06
See application file for complete search history.

(56) References Cited

U.S. PATENT DOCUMENTS 5,770,753 A 6/1998 Kuber et al.
6,342,566 B2 * 1/2002 Burkhardt ........... C08F 297/083 525/240

(Continued)

FOREIGN PATENT DOCUMENTS

CN 1398272 A 2/2003
CN 104755511 A 7/2015

(Continued)

OTHER PUBLICATIONS

International Search Report for PCT/KR2022/004249 mailed Jun. 24, 2022. 5 pgs.

(Continued)

*Primary Examiner* — Peter Y Choi

(74) *Attorney, Agent, or Firm* — Lerner David LLP

(57) ABSTRACT

In the present disclosure, there are provided a polypropylene resin composition including an ethylene propylene copolymer, and a nonwoven fabric produced therefrom. In particular, the polypropylene resin composition of the present disclosure may be prepared by using a continuous reactor in the presence of a metallocene compound having a specific structure. The polypropylene resin composition of the present disclosure can maintain high strength together with excellent processability. Thus, the polypropylene resin composition of the present disclosure can produce a soft non-woven fabric, as compared to the existing products, by optimizing xylene soluble, the content of ethylene, a melt index, a crystallization temperature, a tensile strength and a flexural modulus, together with the narrow molecular weight distribution.

15 Claims, 2 Drawing Sheets

(52) U.S. Cl.
CPC ....... *C08F 2800/20* (2013.01); *C08L 2203/12* (2013.01); *C08L 2205/025* (2013.01); *D10B 2321/022* (2013.01); *D10B 2401/06* (2013.01)

(56) References Cited

U.S. PATENT DOCUMENTS

| | | | | |
|---|---|---|---|---|
| 6,492,465 | B1 | 12/2002 | Burkhardt et al. | |
| 6,657,033 | B1 * | 12/2003 | Sartori | B32B 27/12 264/210.8 |
| 2001/0034411 | A1 | 10/2001 | Burkhardt et al. | |
| 2014/0121325 | A1 | 5/2014 | Holtcamp et al. | |
| 2016/0024288 | A1 | 1/2016 | Hedesiu et al. | |
| 2016/0115266 | A1 | 4/2016 | Töltsch et al. | |
| 2016/0176997 | A1 | 6/2016 | Resconi et al. | |
| 2018/0030256 | A1 | 2/2018 | Tranninger et al. | |
| 2019/0367642 | A1 | 12/2019 | Leskinen et al. | |
| 2020/0140583 | A1 | 5/2020 | Kim et al. | |
| 2020/0240061 | A1 | 7/2020 | Katsuta et al. | |
| 2020/0354492 | A1 | 11/2020 | Ye et al. | |
| 2021/0061931 | A1 | 3/2021 | Park et al. | |
| 2021/0078205 | A1 | 3/2021 | Park et al. | |
| 2021/0171750 | A1 | 6/2021 | Gahleitner et al. | |
| 2022/0145058 | A1 | 5/2022 | Wang et al. | |
| 2022/0306771 | A1 | 9/2022 | Leskinen et al. | |

FOREIGN PATENT DOCUMENTS

| | | | |
|---|---|---|---|
| CN | 110099934 | A | 8/2019 |
| CN | 111670205 | A | 9/2020 |
| CN | 111683977 | A | 9/2020 |
| EP | 1254186 | B1 | 12/2004 |
| JP | 2005068261 | A | 3/2005 |
| JP | 2015193827 | A | 11/2015 |
| JP | 2021507949 | A | 2/2021 |
| KR | 20020074509 | A | 9/2002 |
| KR | 20150135437 | A | 12/2015 |
| KR | 20170094458 | A | 8/2017 |
| KR | 20190062163 | A | 6/2019 |
| KR | 20190066896 | A | 6/2019 |
| KR | 102112631 | B1 | 5/2020 |
| KR | 20200052220 | A | 5/2020 |
| KR | 20200058392 | A | 5/2020 |
| KR | 102223974 | B1 | 3/2021 |
| WO | 2014198677 | A1 | 12/2014 |
| WO | 2015011135 | A1 | 1/2015 |
| WO | 2020239562 | A1 | 12/2020 |

OTHER PUBLICATIONS

International Search Report for PCT/KR2022/004251 mailed Jun. 27, 2022. 5 pages.

Extended European Search Report including Written Opinion for Application No. 22776161.6 dated May 24, 2024, pp. 1-10.

* cited by examiner

【FIG. 1】
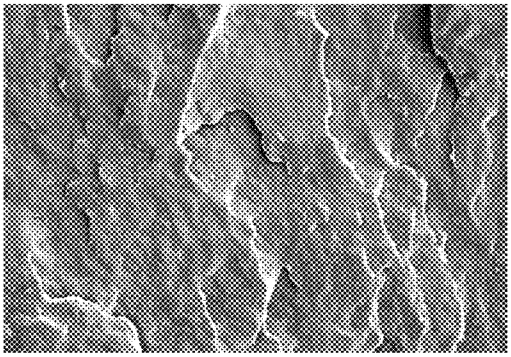
【FIG. 2】
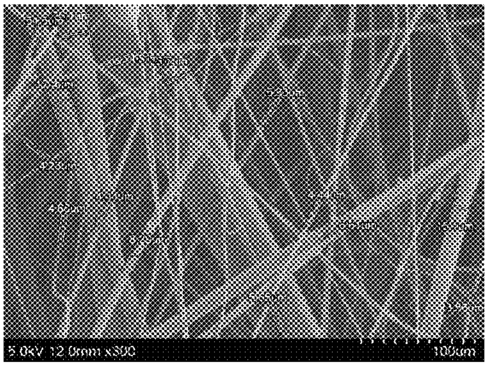
【FIG. 3】
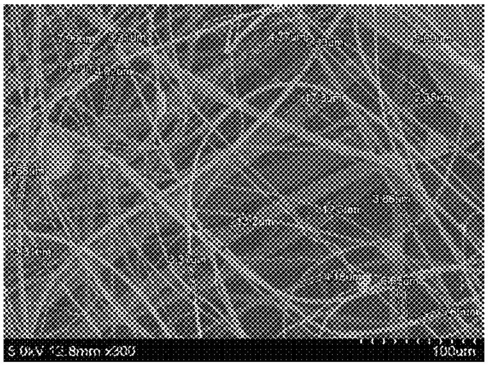

【FIG. 4】
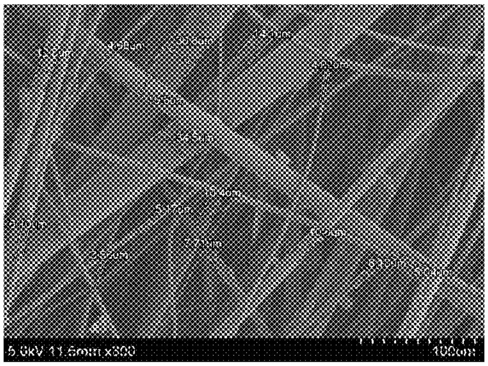

POLYPROPYLENE RESIN COMPOSITION AND NON-WOVEN FABRIC PREPARED USING THE SAME

CROSS CITATION WITH RELATED APPLICATION(S)

This application is a national stage entry under 35 U.S.C. § 371 of International Application No. PCT/KR2022/004251 filed on Mar. 25, 2022, which claims priority from Korean Patent Applications No. 10-2021-0039665 filed on Mar. 26, 2021 and No. 10-2022-0037393 filed on Mar. 25, 2022, all the disclosures of which are incorporated by reference herein.

TECHNICAL FIELD

The present disclosure relates to a polypropylene resin composition maintaining high strength together with excellent processability and being suitable for soft nonwoven fabrics, as compared with existing products, and a nonwoven fabric produced therefrom.

BACKGROUND

Generally, a nonwoven fabric refers to a fabric made by bonding or interlocking fibrous aggregates by mechanical and chemical treatments such as mechanical operation or thermal bonding without passing through spinning, weaving or knitting processes. The nonwoven fabric includes a felt, a resin-bonded nonwoven fabric, a needle punched nonwoven fabric, a spun bonded nonwoven fabric, a spunlace nonwoven fabric, an embossed film, a wet nonwoven fabric, etc. In the narrow sense, it means those used as interlacing nonwoven fabrics or the like by bonding a contact point between randomly stacked webs and fibers with a resin. The nonwoven fabric is called an adhesive cloth and is also called a bonded fabric. These nonwoven fabrics can be produced by various methods, and a needle punching method, a chemical bonding method, a thermal bonding method, a melt blowing method, a spunlace method, a stitch-bonding method, and a spunbond method are known.

On the other hand, a spunbond nonwoven fabric using a polyolefin resin as a raw material is excellent in touch feeling, flexibility, air permeability, heat insulation, etc., and thus is widely used for filters, packaging materials, bedding, clothes, medical supplies, sanitary articles, automobile interior materials, building materials, etc. In particular, polypropylene fibers are processed into a thermal bonded nonwoven fabric through a calendar bonding method or an air through bonding method because of its inherent low melting point and excellent chemical resistance, and they are mainly used as surface materials for sanitary articles such as diapers, sanitary napkins, etc.

Meanwhile, unlike the existing homopolypropylene resins prepared with Ziegler-Natta catalysts, homopolypropylene resins prepared with metallocene catalysts have a narrow molecular weight distribution, and thus is capable of producing uniform fibers with a thin thickness, which has the advantage of producing a low basis weight nonwoven fabric with excellent strength. However, due to the low content of low molecular weight due to the low xylene soluble or narrow molecular weight distribution, the metallocene homopolypropylene resins have disadvantage of giving a rough touch (feel) on the surface of nonwoven fabrics.

Four techniques are used to give a soft touch to the universal Ziegler-Natta homopolypropylene: a bi-component processing technique of using homopolypropylene and polyethylene, for example, a mixing technique of using homopolypropylene and propylene-containing polyolefin (C3-POE), a mixing technique of using homopolypropylene and low modulus polypropylene (LPP), and a mixing technique of using homopolypropylene and polypropylene terpolymer (tPP). However, all of these methods use different kinds of resins in addition to the polypropylene, which improve soft feeling (or softness), as compared to the existing methods. However, these methods are limited in increasing the softness, and problems such as lowered strength of nonwoven fabrics and reduced productivity due to the occurrence of single yarns during processing are necessarily accompanied.

Further, in order to improve the problem of polypropylene prepared with the Ziegler-Natta catalyst, a propylene-1 butene random copolymer prepared with the metallocene catalyst may be used to increase flexibility while maintaining excellent strength property when manufacturing nonwoven fabrics. However, the improvement degree of flexibility is not satisfactory, and the softness property is relatively poor, as compared to products produced by the bi-component processing technique of using the existing Ziegler-Natta-based homopolypropylene and polyethylene or products produced by the mixing technique of using homopolypropylene and propylene-containing polyolefin (C3-POE), and thus there is a disadvantage of giving a rough touch feeling.

Accordingly, it is required to develop a polypropylene resin composition maintaining high strength together with excellent processability and being suitable for soft nonwoven fabrics, as compared with existing products, by using the metallocene catalyst.

DETAILED DESCRIPTION OF THE INVENTION

Technical Problem

In the present disclosure, there are provided a polypropylene resin composition prepared by using a continuous reactor in the presence of a metallocene compound having a specific structure, the polypropylene resin composition maintaining high strength together with excellent processability and being suitable for soft nonwoven fabrics, as compared with existing products, and a method of preparing the same.

Technical Solution

According to one embodiment of the present disclosure, there is provided a polypropylene resin composition, in which a molecular weight distribution (Mw/Mn) is 2.6 to 3.2, xylene soluble (X.S.) is 4.5% by weight to 8.0% by weight, the content of ethylene is 1.0% by weight to 5.0% by weight, a tensile strength is 275 $kg/cm^2$ to 285 $kg/cm^2$, as measured according to the ASTM D 638 method, a flexural modulus is 11500 $kg/cm^2$ to 12500 $kg/cm^2$, as measured according to the ASTM D 790 method, a melt index ($MI_{2.16}$, measured according to the ASTM D 1238 at 230° C. under a load of 2.16 kg) is 10 g/10 min to 100 g/10 min, and a crystallization temperature (Tc) is 95° C. to 115° C.

Meanwhile, there is provided a method of preparing the above-described polypropylene resin composition. The method of preparing the polypropylene resin composition is to prepare the polypropylene resin composition using a series of reactors including at least one first reactor and at least one second reactor in the presence of a catalyst composition including one or more of a metallocene compound represented by the following Formula 1, the method including the steps of preparing a propylene homopolymer in the first reactor; and preparing an ethylene-propylene copolymer in the second reactor.

[Formula 1]

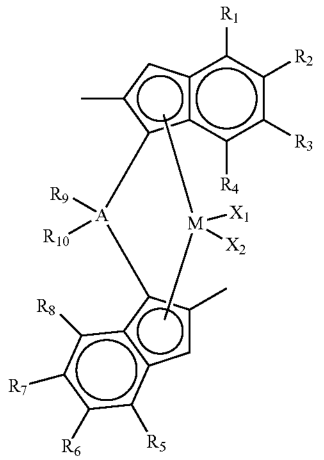

in Formula 1,

A is carbon, silicon, or germanium,

M is a Group 4 transition metal, $X_1$ and $X_2$ are each independently halogen, $R_1$ and $R_5$ are each independently $C_{6-20}$ aryl substituted with $C_{1-20}$ alkyl;

$R_2$ to $R_4$ and $R_6$ to $R_8$ are each independently hydrogen, halogen, $C_{1-20}$ alkyl, $C_{2-20}$-alkenyl, $C_{1-20}$ alkylsilyl, $C_{1-20}$ silylalkyl, $C_{1-20}$ alkoxysilyl, $C_{1-20}$ ether, $C_{1-20}$ silylether, $C_{1-20}$ alkoxy, $C_{6-20}$ aryl, $C_{7-20}$ alkylaryl, or $C_{7-20}$ arylalkyl, and $R_9$ and $R_{10}$ are each independently $C_{1-20}$ alkyl.

In Formula 1, A may be silicon, $R_1$ and $R_5$ may be each phenyl substituted with a $C_{3-6}$ branched alkyl group. Further, $R_9$, and $R_{10}$ may be each $C_{2-4}$ linear alkyl, wherein $R_9$ and $R_{10}$ may be the same as each other, preferably, ethyl.

Further, the metallocene compound may be specifically represented by, for example, the following Formula 1-1:

[Formula 1-1]

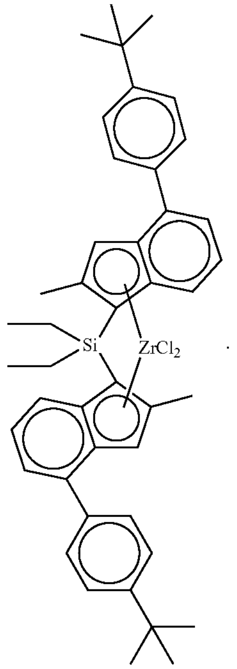

The structural formula of Formula 1-1 is only an example for explaining the present invention, and the present invention is not limited thereto.

For example, the first reactor may be a loop reactor, and the second reactor may be a gas-phase reactor.

Further, in the second reactor, propylene and ethylene may be fed at a weight ratio of 7:3 to 6:4.

Meanwhile, there is provided a polypropylene nonwoven fabric composed of a fiber produced from the above-described polypropylene resin composition.

For example, the polypropylene nonwoven fabric may have a handle-O-meter of 24 g or less, as measured according to the NWSP 090.3.R0 standard, when a basis weight of the nonwoven fabric is 72 $g/m^2$ to 76 $g/m^2$.

The terms used herein are only for explaining exemplary embodiments, and are not intended to limit the present invention.

The singular expression may include the plural expression unless it is differently expressed contextually.

The term “include”, “equip”, or “have” in the present description is only used for explaining characteristics taken effect, numbers, steps, components, or combinations thereof, and do not exclude the existence or the possibility of addition of one or more different characteristics, numbers, steps, components or combinations thereof beforehand.

Further, in this specification, when a layer or an element is mentioned to be formed “on” or “above” layers or elements, it means that each layer or element is directly formed on the layers or elements, or other layers or elements may be additionally formed between the layers, subjects, or substrates.

The present invention may be variously modified and have various forms, and specific embodiments will be illustrated and described in detail as follows. It should be understood, however, that the description is not intended to limit the present invention to the particular forms disclosed, but on the contrary, the intention is to cover all modifications, equivalents, and alternatives falling within the spirit and scope of the invention.

Hereinafter, various embodiments of the present invention will be described in detail.

Polypropylene Resin Composition

The polypropylene resin composition according to one embodiment of the present disclosure is characterized by satisfying all the conditions that a molecular weight distribution (Mw/Mn) is 2.6 to 3.2, xylene soluble (X.S.) is 4.5% by weight to 8.0% by weight, the content of ethylene is 1.0% by weight to 5.0% by weight, a tensile strength is 275 $kg/cm^2$ to 285 $kg/cm^2$, as measured according to the ASTM D 638 method, a flexural modulus is 11500 $kg/cm^2$ to 12500 $kg/cm^2$, as measured according to the ASTM D 790 method, a flexural modulus is 11500 $kg/cm^2$ to 12500 $kg/cm^2$, as measured according to the ASTM D 790 method, a melt index ($MI_{2.16}$, measured according to the ASTM D 1238 at 230° C. under a load of 2.16 kg) is 10 g/10 min to 100 g/10 min, and a crystallization temperature (Tc) is 95° C. to 115° C.

A propylene co(polymer) prepared by a Ziegler-Natta catalyst is characterized in that the polymer has a broad molecular weight distribution and a high xylene soluble, since the multi-active site catalyst is used, in which a plurality of active sites are mixed, and there is a problem in that the composition distribution of the comonomer is not uniform, and thus there is a limit in securing desired physical properties.

Further, when polypropylene is prepared using the existing metallocene catalyst, produced nonwoven fabrics have excellent elongation stability and strength while having a disadvantage of lowered softness, due to a low melting temperature (Tm) and a narrow molecular weight distribution. Therefore, when a diblock copolymer or triblock copolymer is prepared together with ethylene or 1-butene, the flexibility of the nonwoven fabrics may be improved, but the improvement degree of flexibility is not satisfactory. Further, the softness property is relatively poor, as compared to products produced by the bi-component processing technique of using the existing Ziegler-Natta-based homopolypropylene and polyethylene, or products produced by the mixing technique of using homopolypropylene and propylene-containing polyolefin (C3-POE, e.g., propylene-ethylene copolymer elastomer), and thus there is a disadvantage of giving a rough touch feeling.

Accordingly, the present inventors have conducted intensive studies on a polypropylene resin composition maintaining high strength together with excellent processability and being suitable for soft nonwoven fabrics, as compared with the existing products, and as a result, they found that when a polypropylene resin composition is prepared using a metallocene catalyst to be described later, instead of a Ziegler-Natta catalyst, and a series of reactors including a first reactor polymerizing a propylene homopolymer and a second reactor preparing an ethylene propylene copolymer, the polypropylene resin composition is able to satisfy the above conditions, thereby completing the present disclosure.

According to one embodiment of the present disclosure, provided is a polypropylene resin composition maintaining high strength together with excellent processability and being suitable for the production of soft nonwoven fabrics, as compared with the existing products.

More specifically, the molecular weight distribution (Mw/Mn, MWD) of the polypropylene resin composition may be about 2.6 to about 3.2. As described, since the polypropylene resin composition has the narrow molecular weight distribution, elongation stability and stiffness are increased, and thus excellent mechanical properties may be exhibited when producing fiber products for multi-filaments or nonwoven fabrics. More specifically, the molecular weight distribution (Mw/Mn, MWD) of the polypropylene resin composition may be about 2.6 to about 3.0, about 2.6 to about 2.9, or about 2.6 to about 2.8.

In the present disclosure, the molecular weight distribution may be determined by measuring a weight average molecular weight (Mw) and a number average molecular weight (Mn) of the polypropylene resin composition using gel permeation chromatography (GPC), respectively, and calculating a ratio (Mw/Mn) of the weight average molecular weight to the number average molecular weight as the molecular weight distribution.

In detail, Waters PL-GPC220 instrument may be used as a gel permeation chromatography (GPC) instrument, and Polymer Laboratories' PLgel MIX-B column having a length of 300 mm may be used. At this time, the measurement temperature is 160° C., 1,2,4-trichlorobenzene may be used as a solvent, and a flow rate of 1 mL/min may be applied. Polypropylene samples are pre-treated by dissolving in 1,2,4-trichlorobenzene containing 0.0125% BHT at 160° C. for 10 hours using the GPC analyzer (PL-GP220), respectively and prepared at a concentration of 10 mg/10 mL. Then, 200 μL thereof may be fed for measurement. A calibration curve obtained with polystyrene standards may be used to determine the values of Mw and Mn. 9 kinds of polystyrene standard specimens having a weight average molecular weight of 2000 g/mol, 10000 g/mol, 30000 g/mol, 70000 g/mol, 200000 g/mol, 700000 g/mol, 2000000 g/mol, 4000000 g/mol, 10000000 g/mol may be used.

Further, the xylene soluble (X.S.) of the polypropylene resin composition may be 4.5% by weight to 8.0% by weight.

As described, it is characterized in that the xylene soluble (X.S.) may be effectively controlled and optimized to about 4.5% by weight to about 8.0% by weight, together with the narrow molecular weight distribution of about 2.6 to about 3.2. In particular, the xylene soluble is a value indicating the atactic components in the entire polymer and the content of the ethylene propylene copolymer, i.e., amorphous polymer in the entire polymer in the case of a product of a composition including homopolypropylene polymer and ethylene propylene copolymer. It is possible to obtain a polypropylene resin composition capable of expressing appropriate levels of melting point and mechanical properties by optimizing the content of xylene soluble.

As described, when the content of xylene soluble (X.S.) is controlled in the optimal range, processability and elongation property may be improved, and excellent web formation or high strength may be secured and excellent softness may be exhibited when producing multi-filaments or nonwoven fabric products. More specifically, the content of xylene soluble (X.S.) of the polypropylene resin composition may be about 4.5% by weight or more, and about 7.8% by weight or less, or about 7.5% by weight or less, or about 7.3% by weight or less, or about 7.0% by weight or less.

As used herein, xylene soluble indicates the content (wt %) of soluble polymer in crystallized cooled xylene obtained by dissolving the polypropylene resin composition in xylene and crystallizing insoluble parts from the cooled solution. The xylene soluble includes low-tacticity, i.e., amorphous polymer chains. Accordingly, the low content of xylene soluble indicates having high tacticity, i.e., high crystalline polymer. The polypropylene resin composition according to one embodiment of the present disclosure has the low content of crystalline polymer, thereby exhibiting excellent softness when producing nonwoven fabrics. Considering the superiority of the improvement effect by the control of xylene soluble, the xylene soluble of the polypropylene resin composition may be maintained in the range as described above.

Further, in the present disclosure, the xylene soluble is obtained by adding xylene to the polypropylene resin composition sample, completely dissolving the composition by heating at 130° C. for 1 hour or more, cooling it at 20° C. for 1 hour or more, and separating a solid phase and a liquid phase by filtration. The xylene component is removed by heating the liquid phase to 130° C., and the weight of the remaining component may be measured.

More specifically, the polypropylene resin composition according to the present disclosure may include ethylene in an amount of about 1.0% by weight to about 5.0% by weight, or about 1.2% by weight to about 4.8% by weight, or about 1.5% by weight to about 4.5% by weight, or about 1.8% by weight to about 4.0% by weight, or about 1.9% by weight to about 3.5% by weight, or about 2.0% by weight to about 3.2% by weight, or about 2.1% by weight to about 3.0% by weight, or about 2.2% by weight to about 2.7% by weight, based on the total weight of the total resin composition.

Since the polypropylene resin composition includes ethylene by controlling the content of ethylene in the final polymer which is passed through the first and second reactors to be described later within the above described range, heterogeneous comonomers enters between the main chains of the ethylene propylene copolymer, and the ethylene propylene copolymer thus obtained is included in the propylene homopolymer without large phase separation due to high dispersibility, and therefore, softness property of the final resin composition may be controlled. In addition, in terms of exhibiting a narrow molecular weight distribution even in polymerization with a high conversion rate by using a metallocene catalyst having a specific structure to be described later, and also exhibiting excellent elongation stability (processability) and softness property together with improved strength, it is preferable that the polypropylene resin composition includes ethylene in the above-described range.

Meanwhile, the content of ethylene in the polypropylene resin composition of the present disclosure may be measured by a spectroscopic method using an infrared absorption spectrum (FT-IR) according to the American Society for Testing and Materials (ASTM) D 5576.

For example, the content of ethylene is calculated by fixing a film or film-type specimen of the polypropylene resin composition in a magnetic holder of FT-IR equipment, and then measuring the height of the 4800-3500 $cm^{-1}$ peak reflecting the thickness of the specimen and the area of the 750-710 $cm^{-1}$ peak indicating the ethylene component at IR absorption spectrum, respectively. In other words, the contents of ethylene are calculated by putting the measured values into a calibration formula which is obtained by plotting values obtained by dividing each peak area of the standard sample by the peak height of 4800-3500 $cm^{-1}$, according to the American Society for Testing and Materials (ASTM) D 5576, respectively. The method of measuring the content of ethylene in the polypropylene resin composition may be more specifically described in Test Example 1 to be described later.

Further, the polypropylene resin composition is characterized in that a tensile strength and a flexural modulus are maintained in the optimal ranges while simultaneously optimizing the molecular weight distribution, the xylene soluble, and the content of ethylene, as described above.

Specifically, the polypropylene resin composition has the tensile strength of 275 $kg/cm^2$ to 285 $kg/cm^2$, as measured according to the ASTM D 638 method, and the flexural modulus of 11500 $kg/cm^2$ to 12500 $kg/cm^2$, as measured according to the ASTM D 790 method.

Preferably, the polypropylene resin composition may have the tensile strength of 276 $kg/cm^2$ to 284 $kg/cm^2$, or 278 $kg/cm^2$ to 283 $kg/cm^2$, as measured according to the ASTM D 638 method, and the flexural modulus of 11600 $kg/cm^2$ to 12400 $kg/cm^2$, or 11800 $kg/cm^2$ to 12300 $kg/cm^2$, as measured according to the ASTM D 790 method.

Further, the polypropylene resin composition may have the flexural strength of 375 $kg/cm^2$ to 385 $kg/cm^2$, or 376 $kg/cm^2$ to 384 $kg/cm^2$, or 378 $kg/cm^2$ to 383 $kg/cm^2$, as measured according to the ASTM D 790 method.

As described, the polypropylene resin composition according to one embodiment of the present disclosure may exhibit excellent processability and softness property together with high stiffness by optimizing the molecular weight distribution, the xylene soluble (X.S.), and the content of ethylene, and the tensile strength and the flexural modulus at the same time.

Further, the melt index ($MI_{2.16}$) of the polypropylene resin composition is about 10 g/10 min to about 100 g/10 min, as measured according to the American Society for Testing and Materials (ASTM) D 1238 at 230° C. under a load of 2.16 kg. As described, the range of the melt index may be optimized to obtain the polypropylene resin composition suitable for fiber products for multi-filaments or nonwoven fabrics. More specifically, the melt index ($MI_{2.16}$) of the polypropylene resin composition may be about 12 g/10 min or more, or about 15 g/10 min or more, or about 18 g/10 min or more, or about 20 g/10 min or more, or about 23 g/10 min, or about 25 g/10 min or more, and about 85 g/10 min or less, or about 60 g/10 min or less, or about 45 g/10 min or less, or about 40 g/10 min or less, or about 35 g/10 min or less, or about 30 g/10 min or less.

Further, the crystallization temperature (Tc) of the polypropylene resin composition may be 95° C. to 115° C.

The polypropylene resin composition of the present disclosure is characterized in that its crystallization temperature (Tc) is optimized to about 95° C. to about 115° C. by effectively controlling the xylene soluble (X.S.) and the content of ethylene, and the tensile strength and the flexural modulus, and the crystallization temperature (Tc), together with the above-described molecular weight distribution. In particular, the xylene soluble is a value indicating the content of the atactic components in the entire polymer. It is possible to obtain a polypropylene resin composition capable of expressing appropriate levels of melting point and mechanical properties by optimizing the content of xylene soluble.

Specifically, the crystallization temperature (Tc) of the polypropylene resin composition may be about 100° C. to about 115° C., or about 105° C. to about 114° C., or about 107° C. to about 113° C., or about 108° C. to about 112° C.

Further, the melting temperature (Tm) of the polypropylene resin composition may be about 150° C. to about 158° C., or about 150° C. to about 155° C., or about 151° C. to about 153° C.

In the present disclosure, the crystallization temperature (Tc) and the melting temperature (Tm) may be measured using a differential scanning calorimeter (DSC, device name: DSC 2920, manufacturer: TA instrument). In detail, the polypropylene resin composition is heated up to 200° C. by increasing the temperature, and maintained at that temperature for 5 minutes (1$^{st}$ RUN thermal history elimination). Then, the temperature is cooled to −30° C. and again allowed to increase. The temperature at the top of the DSC (differential scanning calorimeter manufactured by TA instrument) curve is referred to as the melting point (Tm). Then, the temperature is allowed to decrease, and the temperature at the top of the DSC (differential scanning calorimeter manufactured by TA instrument) curve is referred to as the crystallization temperature (Tc). Herein, the temperature is increased and decreased at a rate of 10° C./min, respectively, and the melting temperature (Tm) and the crystallization temperature (Tc) are represented by the results measured at the second heating, cooling period (2$^{nd}$ RUN).

As described, unlike the existing polypropylene to which the Ziegler-Natta catalyst is applied, or unlike the existing polypropylene to which the metallocene catalyst is applied, the polypropylene resin composition of the present disclosure may produce thin and uniform fibers while securing excellent process stability during the copolymerization process, and may not only give a softer touch feeling than existing products, but also have high strength to realize excellent stiffness without being easily torn by optimizing all of the molecular weight distribution, the xylene soluble, the content of ethylene, the melt index, the crystallization temperature, the tensile strength and the flexural modulus. Therefore, the polypropylene resin composition may be useful particularly for producing polypropylene nonwoven fabrics requiring high stiffness and excellent softness.

Specifically, the polypropylene resin composition includes the propylene homopolymer and the ethylene propylene copolymer, wherein the ethylene propylene copolymer is dispersed in the propylene homopolymer. In particular, the polypropylene resin composition of the present disclosure may include ethylene propylene copolymer dispersed in the ethylene propylene copolymer without large phase separation due to high dispersibility, the copolymers resulting from a polymerization process in a first reactor and a polymerization process in a second reactor in the presence of a catalyst composition including one or more of a metallocene compound represented by Formula 1, as described later. Thus, the final resin composition may exhibit excellent elongation stability (processability) and softness property and improved strength.

The resin composition of the present disclosure may further include one or more additives such as antioxidants, neutralizers, dispersants, weathering agents, UV stabilizers, slip agents, anti-blocking agents, and antistatic agents, as long as these additives do not impair the properties of the resin composition. The content of these additives may be 500 ppm to 3000 ppm, based on the total weight of the entire resin composition. In particular, these additives are added to the polypropylene resin composition which is obtained after completing all the processes of the first and second reactors as described later, and it is not desirable to use the additives during the polymerization process, because they may affect catalyst activity during the production process. Meanwhile, the polypropylene resin composition according to the present disclosure does not include nucleating agents, such as dibenzylidene sorbitol, di(p-methylbenzylidene)sorbitol, dimethyl benzylidene sorbitol, aluminum salt of alkyl benzoic acid, and organic phosphorus metal salt, etc. When such a nucleating agent is added to the polypropylene resin composition according to the present disclosure, crystallinity becomes too high, and thus the fiber spinnability is lowered, which may reduce the effect of improving elongation stability and softness.

Method of Preparing Polypropylene Resin Composition

Meanwhile, according to another embodiment of the present disclosure, provided is a method of preparing the above-described polypropylene resin composition having physical properties as above.

The method of preparing the polypropylene resin composition is to prepare the polypropylene resin composition using a series of reactors including at least one first reactor and at least one second reactor in the presence of a catalyst composition including one or more of a metallocene compound represented by the following Formula 1, the method including the steps of preparing a propylene homopolymer in the first reactor; and preparing an ethylene-propylene copolymer in the second reactor.

[Formula 1]

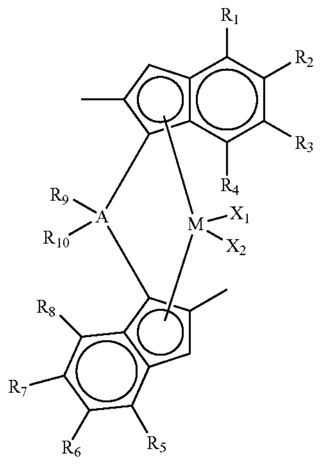

in Formula 1,

A is carbon, silicon, or germanium,

M is a Group 4 transition metal, $X_1$ and $X_2$ are each independently halogen, $R_1$ and $R_5$ are each independently $C_{6-20}$ aryl substituted with $C_{1-20}$ alkyl;

$R_2$ to $R_4$ and $R_6$ to $R_8$ are each independently hydrogen, halogen, $C_{1-20}$ alkyl, $C_{2-20}$-alkenyl, $C_{1-20}$ alkylsilyl, $C_{1-20}$ silylalkyl, $C_{1-20}$ alkoxysilyl, $C_{1-20}$ ether, $C_{1-20}$ silylether, $C_{1-20}$ alkoxy, $C_{6-20}$ aryl, $C_{7-20}$ alkylaryl, or $C_{7-20}$ arylalkyl, and $R_9$ and $R_{10}$ are each independently $C_{1-20}$ alkyl.

Meanwhile, unless otherwise specified herein, the following terms may be defined as follows.

The halogen may be fluorine (F), chlorine (Cl), bromine (Br) or iodine (I).

The alkyl group having 1 to 20 carbon atoms, i.e., the $C_{1-20}$ alkyl group may be a linear, branched or cyclic alkyl group. Specifically, the alkyl group having 1 to 20 carbon atoms may be a linear alkyl group having 1 to 20 carbon atoms; a linear alkyl group having 1 to 15 carbon atoms; a linear alkyl group having 1 to 5 carbon atoms; a branched or cyclic alkyl group having 3 to 20 carbon atoms; a branched or cyclic alkyl group having 3 to 15 carbon atoms; or a branched or cyclic alkyl group having 3 to 10 carbon atoms. For example, the ($C_{1-20}$) alkyl group having 1 to 20 carbon atoms may be methyl, ethyl, propyl, iso-propyl, n-butyl, tert-butyl, pentyl, hexyl, heptyl, octyl, cyclopropyl, cyclobutyl, cyclopentyl, cyclohexyl, cycloheptyl, cyclooctyl, etc., but is not limited thereto.

The alkenyl group having 2 to 20 carbon atoms, i.e., the $C_{2-20}$ alkenyl group may include linear or branched alkenyl, specifically, allyl, ethenyl, propenyl, butenyl, pentenyl, etc., but is not limited thereto.

The alkoxy group having 1 to 20 carbon atoms, i.e., the $C_{1-20}$ alkoxy group may include methoxy, ethoxy, iso-propoxy, n-butoxy, tert-butoxy, phenyloxy, cyclohexyloxy group, etc., but is not limited thereto.

The alkoxyalkyl group having 2 to 20 carbon atoms, i.e., the $C_{2-20}$ alkoxyalkyl group is a functional group, in which one or more hydrogens of the above-described alkyl are substituted with alkoxy, specifically, alkoxyalkyl such as methoxymethyl, methoxyethyl, ethoxymethyl, iso-propoxymethyl, iso-propoxyethyl, iso-propoxypropyl, iso-propoxyhexyl, tert-butoxymethyl, tert-butoxyethyl, tert-butoxypropyl, tert-butoxyhexyl, etc.; or aryloxyalkyl such as phenoxyhexyl, etc., but is not limited thereto.

The alkylsilyl group having 1 to 20 carbon atoms, i.e., the $C_{1-20}$ alkylsilyl group, or the alkoxysilyl group having 1 to 20 carbon atoms, i.e., the $C_{1-20}$ alkoxysilyl group is a functional group, in which one or three hydrogens of $—SiH_3$ are substituted with one to three alkyl or alkoxy as described above, specifically, alkylsilyl such as methylsilyl, dimethylsilyl, trimethylsilyl, dimethylethylsilyl, diethylmethylsilyl, dimethylpropylsilyl, etc.; alkoxysilyl such as methoxysilyl, dimethoxysilyl, trimethoxysilyl, dimethoxyethoxysilyl, etc.; alkoxyalkylsilyl such as methoxydimethylsilyl, diethoxymethylsilyl, dimethoxypropylsilyl, etc., but is not limited thereto.

The silylalkyl group having 1 to 20 carbon atoms, i.e., the $C_{1-20}$ silylalkyl group is a functional group, in which one or more hydrogens of alkyl as described above are substituted with silyl, specifically, $—CH_2—SiH_3$, methylsilylmethyl or dimethylethoxysilylpropyl, etc., but is not limited thereto.

Further, the alkylene group having 1 to 20 carbon atoms, i.e., the $C_{1-20}$ alkylene group is the same as the above-described alkyl, except that it is a divalent substituent, specifically, methylene, ethylene, propylene, butylene, pentylene, hexylene, heptylene, octylene, cyclopropylene, cyclobutylene, cyclopentylene, cyclohexylene, cycloheptylene, cyclooctylene, etc., but is not limited thereto.

The aryl group having 6 to 20 carbon atoms, i.e., the $C_{6-20}$ aryl group may be a monocyclic, bicyclic, or tricyclic aromatic hydrocarbon. For example, the aryl may include phenyl, biphenyl, naphthyl, anthracenyl, phenanthrenyl, fluorenyl, etc., but is not limited thereto.

The alkylaryl group having 7 to 20 carbon atoms, i.e., the $C_{7-20}$ alkylaryl group may refer to a substituent in which one or more hydrogens among hydrogens of aromatic ring are substituted with the above-described alkyl. For example, the alkylaryl may include methylphenyl, ethylphenyl, methylbiphenyl, methylnaphthyl, etc., but is not limited thereto.

Further, the arylalkyl group having 7 to 20 carbon atoms, i.e., the $C_{7-20}$ arylalkyl group may refer to a substituent, in which one or more hydrogens of the above-described alkyl are substituted with the above-described aryl. For example, the arylalkyl may include phenylmethyl, phenylethyl, biphenylmethyl, naphthylmethyl, etc., but is not limited thereto.

Further, the aryloxy group having 6 to 20 carbon atoms, i.e., the $C_{6-20}$ aryloxy group may include phenoxy, biphenoxy, naphthoxy, etc., but is not limited thereto.

Further, the arylene group having 6 to 20 carbon atoms, i.e., the $C_{6-20}$ arylene group is the same as the above-described aryl, except that it is a divalent substituent, specifically, phenylene, biphenylene, naphthylene, anthracenylene, phenanthrenylene, fluorenylene, etc., but is not limited thereto.

Further, the Group 4 transition metal may be titanium (Ti), zirconium (Zr), hafnium (Hf), or rutherfordium (Rf), specifically titanium (Ti), zirconium (Zr), or hafnium (Hf), and more specifically, zirconium (Zr), or hafnium (Hf), but is not limited thereto.

Further, the Group 13 element may be boron (B), aluminum (Al), gallium (Ga), indium (In), or thallium (TI), specifically, boron (B), or aluminum (Al), but is not limited thereto.

The above-mentioned substituents may be optionally substituted with one or more substituents selected from the group consisting of a hydroxyl group; halogen; alkyl; alkenyl; aryl; alkoxy; alkyl, alkenyl, aryl, or alkoxy each containing one or more heteroatoms among the heteroatoms of Groups 14 to 16; silyl; alkylsilyl; alkoxysilyl; a phosphine group; a phosphide group; a sulfonate group; and a sulfone group within the range of exhibiting the effect which is the same as or similar to the desired effect.

The catalyst composition which is used in the preparation of the polypropylene resin composition according to one embodiment of the present disclosure is characterized by including the metallocene compound represented by Formula 1. In particular, when a metallocene catalyst having a specific substituent in a bridging group connecting two ligands including indenyl groups is used, it is possible to prepare a polypropylene having an optimized melting point and molecular weight distribution to meet the desired physical properties.

Moreover, the compound of Formula 1 includes a divalent functional group A di-substituted with the same alkyl groups having two or more carbon atoms as the bridge group connecting two ligands including indenyl groups. Thus, as the atomic size is larger, the available angle is increased, and access of propylene or ethylene monomer becomes easy, thereby exhibiting more excellent catalytic activity.

Further, since the positions 2 of two indenyl groups which are ligands in the compound of Formula 1 are respectively substituted with a methyl group, and the positions 4 (i.e., $R_1$ and $R_5$) respectively include an aryl group substituted with alkyl, more excellent catalytic activity may be exhibited by an inductive effect of supplying sufficient electrons.

More specifically, in Formula 1, $R_1$ and $R_5$ may be each independently $C_{6-12}$ aryl substituted with $C_{1-10}$ alkyl, and much more specifically, phenyl substituted with $C_{3-6}$ branched alkyl such as tert-butyl phenyl. Further, the alkyl substitution position with respect to the phenyl may be a position 4 corresponding to a para position to $R_1$ and $R_5$ bound to indenyl.

Further, in Formula 1, $R_2$ to $R_7$ may be each independently hydrogen, and $X_1$ and $X_2$ may be each independently chlorine (Cl).

Further, in Formula 1, A may be silicon (Si). Further, in terms of improving the supporting efficiency by increasing solubility, $R_9$ and $R_{10}$, which are substituents of A, may be the same as each other, and may be $C_{2-10}$ alkyl groups, specifically, $C_{2-4}$ linear alkyl groups, and more specifically, ethyl groups, respectively. As described, since the substituents of A of the bridge group are the same alkyl groups, it is possible to solve the problem of poor supporting reactivity due to poor solubility during the preparation of a supported catalyst when the substituents of the elements of the bridge group are methyl groups having one carbon atom.

Further, in Formula 1, M may be zirconium (Zr) or hafnium (Hf), and preferably, zirconium (Zr). In particular, when the compound of Formula 1 includes zirconium (Zr) as a central metal, it has more orbitals capable of accepting electrons, as compared to those containing another Group 4 element such as hafnium (Hf), etc. Thus, it is able to bind to monomers with higher affinity, resulting in much improved catalytic activity.

A representative example of the metallocene compound represented by Formula 1 is as follows:

[Formula 1-1]

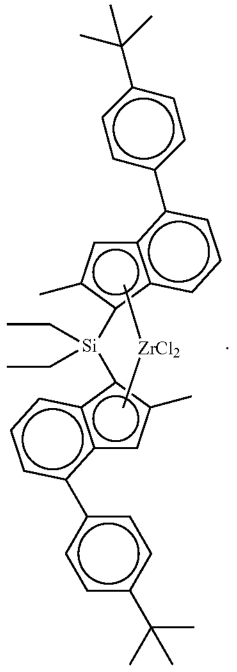

The metallocene compound represented by Formula 1 may be synthesized by applying a known method of synthesizing organic compounds, and described in more detail in Examples to be described later.

Meanwhile, in the method of preparing the metallocene compound or the catalyst composition of the present disclosure, equivalent (eq) means molar equivalent (eq/mol).

In the catalyst composition which is used in the preparation of the polypropylene resin composition according to one embodiment of the present disclosure, the metallocene compound of Formula 1 may be used in the form of a supported catalyst, while being supported on a support, or in the form of a non-supported catalyst. In particular, in terms of securing stability of the polymerization process of using the catalyst composition and uniform control of physical properties, the metallocene compound is more preferably used in the form of a supported catalyst.

As the support, a support containing highly reactive hydroxyl groups or siloxane groups on its surface may be used. Preferably, a support containing highly reactive hydroxyl groups and siloxane groups, which is dried at a high temperature to remove moisture on the surface, may be used.

For example, silica, silica-alumina, silica-magnesia, etc. dried at a high temperature may be used, and may commonly include oxide, carbonate, sulfate, and nitrate, such as $Na_2O$, $K_2CO_3$, $BaSO_4$, $Mg(NO_3)_2$, etc.

The drying temperature of the support is preferably about 200° C. to about 800° C., more preferably, about 300° C. to about 600° C., and most preferably, about 300° C. to about 400° C. When the drying temperature for the support is lower than about 200° C., too much moisture remains and the moisture on the surface may react with the cocatalyst. When the drying temperature is higher than about 800° C., pores on the surface of the support may be combined with each other to reduce surface area, and many hydroxyl groups may be lost from the surface, leaving only siloxane groups. Thus, reactive sites with the cocatalyst may be reduced, which is not preferred.

For example, the amount of the hydroxyl groups on the support surface is preferably about 0.1 mmol/g to about 10 mmol/g, and more preferably about 0.5 mmol/g to about 5 mmol/g. The amount of the hydroxyl groups on the support surface may be controlled by a preparation method of the support and preparation conditions, or drying conditions, for example, temperature, time, vacuum or spray drying, etc. When the amount of hydroxyl groups is less than about 0.1 mmol/g, reactive sites with the cocatalyst may be reduced. When the amount of hydroxyl groups is more than about 10 mmol/g, it may be caused by moisture besides the hydroxyl groups present on the surface of support particles, which is not desirable.

When the metallocene compound of Formula 1 is supported on the support, a weight ratio of the total transition metal included in the metallocene compound represented by Formula 1 to the support may be about 1:1 to about 1:1000. When the support and the metallocene compound are included at the above weight ratio, appropriate activity of the supported catalyst may be exhibited, which may be advantageous in terms of maintaining the catalytic activity and economic feasibility. More specifically, the weight ratio of the compound of Formula 1 to the support may be 1:10 to 1:30, and much more specifically 1:15 to 1:20.

In addition to the metallocene compound of Formula 1 and the support, the catalyst composition may include a cocatalyst in terms of high activity and process stability improvement.

Specifically, the cocatalyst may include one or more of the compound represented by the following Formula 2:

$$—[Al(R^{21})—O]_m— \quad \text{[Formula 2]}$$

in Formula 2, $R^{21}$'s are the same as or different from each other, and each independently halogen, $C_{1-20}$ alkyl, or $C_{1-20}$ haloalkyl; and m is an integer of 2 or more.

Examples of the compound represented by Formula 2 may include aluminoxane-based compounds, such as methylaluminoxane, ethylaluminoxane, isobutylaluminoxane, butylaluminoxane, etc., and any one or a mixture of two or more thereof may be used.

Further, the cocatalyst may include one or more of the compound represented by the following Formula 3:

$$J(R^{31})_3 \quad \text{[Formula 3]}$$

in Formula 3, $R_{31}$'s are the same as or different from each other, and each independently halogen, $C_{1-20}$ alkyl, or $C_{1-20}$ haloalkyl; and J is aluminum or boron.

Examples of the compound represented by Formula 3 may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-polyaluminum, dimethylaluminummethoxide, dimethylaluminumethoxide, trimethylboron, triethylboron, triisobutylboron, tripropylboron, tributylboron, etc., and more specifically, selected from trimethylaluminum, triethylaluminum, and triisobutylaluminum.

Further, the cocatalyst may include one or more of the compound represented by the following Formula 4:

$$[E\text{-}H]^+[ZQ_4]^- \quad \text{[Formula 4]}$$

in Formula 4,

E is a neutral or cationic Lewis base;

H is a hydrogen atom;

Z is a Group 13 element;

Q's are the same as or different from each other, and each independently $C_{6-20}$ aryl or $C_{1-20}$ alkyl, wherein $C_{6-20}$ aryl or $C_{1-20}$ alkyl is unsubstituted or substituted with one or more substituents selected from the group consisting of halogen, $C_{1-20}$ alkyl, $C_{1-20}$ alkoxy, and $C_{6-20}$ aryloxy.

Specifically, in Formula 4, $[E\text{-}H]^+$ is a Brønsted acid.

Meanwhile, in Formula 4, E may be amine including one or more nitrogen atoms, wherein the amine may be substituted with $C_{6-20}$ aryl or $C_{1-20}$ alkyl. For example, E may be amine including one or two nitrogen atoms, wherein the amine may be substituted with two or more of $C_{6-20}$ aryl or $C_{1-20}$ alkyl, or the amine may be substituted with two or three of $C_{6-15}$ aryl or $C_{6-12}$ aryl, or $C_{1-12}$ alkyl or $C_{1-6}$ alkyl.

Specifically, in Formula 4, Z may be aluminum or boron.

Specifically, in Formula 4, Q's may be each substituted or unsubstituted $C_{6-18}$ aryl or $C_{6-12}$ aryl, or $C_{1-12}$ alkyl or $C_{1-6}$ alkyl.

Examples of the compound represented by Formula 4 may include triethylammoniumtetraphenylboron, tributylammoniumtetraphenylboron, trimethylammoniumtetraphenylboron, tripropylammoniumtetraphenylboron, trimethylammoniumtetra(p-tolyl)boron, trimethylammoniumtetra(o, p-dimethylphenyl)boron, tributylammoniumtetra(p- trifluoromethylphenyl)boron, trimethylammoniumtetra(p-trifluoromethylphenyl)boron, tributylammoniumtetrapentafluorophenylboron, N,N-diethylaniliniumtetraphenylboron, N,N-diethylaniliniumtetrapentafluorophenylboron, diethylammoniumtetrapentafluorophenylboron, triphenylphosphoniumtetraphenylboron, trimethylphosphoniumtetraphenylboron, triethylammoniumtetraphenylaluminum, tributylammoniumtetraphenylaluminum, trimethylammoniumtetraphenylaluminum, tripropylammoniumtetraphenylaluminum, trimethylammoniumtetra(p-tolyl)aluminum, tripropylammoniumtetra(p-tolyl)aluminum, triethylammoniumtetra(o,p-dimethylphenyl)aluminum, tributylammoniumtetra(p-trifluoromethylphenyl)aluminum, trimethylammoniumtetra(p-trifluoromethylphenyl)aluminum, tributylammoniumtetrapentafluorophenylaluminum, N,N-diethylaniliniumtetraphenylaluminum, N,N-diethylaniliniumtetrapentafluorophenylaluminum, diethylammoniumtetrapentatetraphenylaluminum, triphenylphosphoniumtetraphenylaluminum, trimethylphosphoniumtetraphenylaluminum, tripropylammoniumtetra(p-tolyl)boron, triethylammoniumtetra(o,p-dimethylphenyl)boron, tributylammoniumtetra(p-trifluoromethylphenyl)boron, triphenylcarboniumtetra(p-trifluoromethylphenyl)boron, triphenylcarboniumtetrapentafluorophenylboron, etc., and among them, any one or a mixture of two or more thereof may be used.

When the cocatalyst is further included, the weight ratio of the metallocene compound of Formula 1 to the cocatalyst may be about 1:1 to about 1:20. When the cocatalyst and the metallocene compound are included at the above weight ratio, appropriate activity of the supported catalyst may be exhibited, which may be advantageous in terms of maintaining the catalytic activity and economic feasibility. More specifically, the weight ratio of the compound of Formula 1 to the cocatalyst may be about 1:5 to about 1:20, or about 1:5 to about 1:15.

The cocatalyst may be supported in an amount of about 3 mmol or more, or about 5 mmol or more, and about 20 mmol or less, or about 15 mmol or less, based on the weight of the support, e.g., about 1 g of silica. When included within the above content range, the effect of improving the catalytic activity by use of the cocatalyst may be exhibited.

When the catalyst composition includes all of the support and the cocatalyst, the catalyst composition may be prepared by a method including the steps of supporting the cocatalyst compound on the support, and supporting the compound represented by Formula 1 on the support. In this regard, the supporting order of the cocatalyst and the metallocene compound of Formula 1 may be changed, as needed.

In this regard, as a reaction solvent used in the preparation of the catalyst composition, a hydrocarbon solvent such as pentane, hexane, heptane, etc., or an aromatic solvent such as benzene, toluene, etc. may be used.

Meanwhile, the polypropylene resin composition according to one embodiment of the present disclosure may be prepared by a method of preparing the polypropylene resin composition using a series of reactors including at least one first reactor and at least one second reactor in the presence of the catalyst composition including one or more of the metallocene compound represented by Formula 1, the method including the steps of preparing the propylene homopolymer in the first reactor; and preparing the ethylene-propylene copolymer in the second reactor.

For example, the method of preparing the polypropylene resin composition of the present disclosure may include the steps of preparing the propylene homopolymer in the first reactor; and preparing the ethylene-propylene copolymer to be dispersed in the propylene homopolymer in the second reactor.

Specifically, in the present disclosure, the polypropylene resin composition may be prepared by using a series of reactors including at least one first reactor and at least one second reactor in the presence of the catalyst composition including one or more of the metallocene compound represented by Formula 1, the polypropylene resin composition thus prepared including the propylene homopolymer and the ethylene propylene copolymer, wherein the ethylene propylene copolymer is dispersed in the propylene homopolymer. In particular, in the present disclosure, by optimizing the polymerization process of the first reactor and the copolymerization process of the second reactor in the presence of the catalyst composition including one or more of the metallocene compound represented by Formula 1, the ethylene propylene copolymer thus obtained is included with high dispersity in the propylene homopolymer without large phase separation. Thus, the final resin composition may exhibit excellent processability and transparency together with high elongation property to maintain excellent impact strength.

The polypropylene resin composition according to one embodiment of the present disclosure may be prepared by a bulk-slurry process and a gas phase process in the presence of the catalyst composition including one or more of the metallocene compound represented by Formula 1.

In this regard, the first reactor may be a loop reactor, and for example, a spheripol process reactor including two loop reactors. Further, the second reactor may be a gas phase reactor.

Meanwhile, in the present disclosure, the polypropylene resin composition is characterized by preparing the ethylene propylene copolymer in a continuous reactor of a bulk-slurry process, i.e., a gas phase process. The polypropylene resin composition of the present disclosure may significantly improve the overall process efficiency, unlike existing polymerization, in which a solution process should be applied in order to prepare a propylene-based elastomer having a high content of ethylene, i.e., polymerization is performed in the presence of a solvent in the reactor due to low melting temperature (Tm) according to the high content of the comonomer such as ethylene, etc.

Further, in the method of preparing the polypropylene resin composition according to the present disclosure, a bulk-slurry process, and subsequently, a gas phase process are performed using a continuous reactor in the presence of the catalyst composition including one or more of the metallocene compound represented by Formula 1 to minimize the phase separation between the propylene homopolymer obtained in the first reactor and the ethylene propylene copolymer obtained in the second reactor, thereby remarkably improving transparency and elongation of the final polypropylene resin composition.

Specifically, the first reactor consists of a reaction system including a plurality of loop reactors. The propylene homopolymer may be produced by continuously polymerizing a liquid propylene monomer in the presence of the catalyst and hydrogen gas in the reaction system including a plurality of loop reactors. For example, the content of hydrogen gas for each of the plurality of loop reactors may be in the range of 0.07 L to 4 L under a reactor condition of 1 atm, or may be fed at a pressure of 1 bar to bar, or may be introduced at 150 ppm to 8000 ppm in the hydrogen molar content range with respect to the propylene monomer. The input amount of hydrogen gas is a value of the molar content (ppm), based on the input amount of propylene. More specifically, the reaction system of the first reactor for producing the propylene homopolymer includes 1-1 and 1-2 loop reactors, wherein hydrogen gas may be introduced into the 1-1 loop reactor at a concentration of 150 ppm to 8000 ppm, and hydrogen gas may be introduced into the 1-2 loop reactor at a concentration equal to or higher than the concentration introduced into the 1-1 loop reactor, and at a concentration of 8000 ppm or less. Preferably, in the first reactor, the input amount of hydrogen may be 160 ppm or more, or 170 ppm or more, or 180 ppm or more, or 190 ppm or more, or 200 ppm or more, or 250 ppm or more, or 300 ppm or more, or 350 ppm or more, or 380 ppm or more, or 400 ppm or more, or 430 ppm or more, and 6000 ppm or less, or 4000 ppm or less, or 2000 ppm or less, or 1800 ppm or less, or 1500 ppm or less, or 1200 ppm or less, or 1000 ppm or less, or 800 ppm or less, or 650 ppm or less.

Further, the polymerization reaction in the first reactor may be performed at a temperature of 25° C. to 500° C. under a pressure of 1 $kgf/cm^2$ to 100 $kgf/cm^2$ for 1 hours to 24 hours. In this regard, the polymerization reaction temperature in the first reactor may be preferably 25° C. to 250° C., or 30° C. to 200° C., or 35° C. to 180° C., or 40° C. to 150° C., or 45° C. to 120° C., or 50° C. to 100° C., or 60° C. to 85° C. Further, the polymerization reaction pressure in the first reactor may be preferably 1 $kgf/cm^2$ to 80 $kgf/cm^2$, or 1 $kgf/cm^2$ to 70 $kgf/cm^2$, or 1 $kgf/cm^2$ to 60 $kgf/cm^2$, or 2 $kgf/cm^2$ to 55 $kgf/cm^2$, or 3 $kgf/cm^2$ to 50 $kgf/cm^2$, or 4 $kgf/cm^2$ to 45 $kgf/cm^2$, or 5 $kgf/cm^2$ to 40 $kgf/cm^2$. The polymerization reaction time is preferably 1 hour to 5 hours.

In the present disclosure, it is possible to prepare the polypropylene resin composition having excellent elongation together with high transparency, for example, by preparing the propylene homopolymer in the first reactor and preparing the ethylene propylene copolymer to be dispersed in the propylene homopolymer with minimized phase separation in the second reactor using the continuous reactor in the presence of the metallocene compound of Formula 1.

Specifically, the copolymerization process of preparing the ethylene propylene copolymer in the second reactor, which is dispersed in the propylene homopolymer obtained in the first reactor, is performed by the gas-phase reaction. Such a copolymerization process in the second reactor is performed by transporting and introducing the propylene homopolymer prepared in the first reactor, and then additionally introducing propylene and ethylene. Here, when the propylene homopolymer prepared in the first reactor is transported to the second reactor (gas phase reactor), residual propylene monomer and hydrogen gas remaining after the first recovery process in the first reactor are transported with the propylene homopolymer. Preferably, when the propylene homopolymer prepared in the first reactor is transported to the second reactor (gas phase reactor), treatment with an antistatic agent which is used when applying the existing Ziegler-Natta catalyst may be omitted.

Further, the copolymerization reaction in the second reactor may be performed at a temperature of 28° C. to 500° C. under a pressure of 1 $kgf/cm^2$ to 80 $kgf/cm^2$ for 1 hours to 24 hours. In this regard, the copolymerization reaction temperature in the second reactor may be preferably 30° C. to 250° C., or 35° C. to 200° C., or 40° C. to 180° C., or 45° C. to 150° C., or 50° C. to 120° C., or 55° C. to 100° C., or 65° C. to 85° C. Further, the copolymerization reaction pressure in the second reactor may be preferably 1 $kgf/cm^2$ to 65 $kgf/cm^2$, or 1 $kgf/cm^2$ to 55 $kgf/cm^2$, or 1 $kgf/cm^2$ to 50 $kgf/cm^2$, or 2 $kgf/cm^2$ to 40 $kgf/cm^2$, or 3 $kgf/cm^2$ to 35 $kgf/cm^2$, or 4 $kgf/cm^2$ to 30 $kgf/cm^2$, or 5 $kgf/cm^2$ to 25 $kgf/cm^2$. The polymerization reaction time is preferably 1 hour to 5 hours.

The copolymerization process in the second reactor may be performed under conditions in which hydrogen is added or not added. However, when unreacted propylene and hydrogen gas after the first recovery process are transported to the second reactor together with the propylene homopolymer obtained in the polymerization process in the first reactor, additional hydrogen gas is not added or a trace amount of hydrogen is added to the second reactor to perform the copolymerization process of the gas phase reaction in which only propylene and ethylene are additionally added. Here, when a trace amount of hydrogen is added, hydrogen may be introduced in an amount of about 0.01 times or less, or about 0.005 times or less, or about 0.001 times or less the amount of hydrogen used in the first reactor. For example, hydrogen may be introduced in an amount of about 80 ppm or less, or about 50 ppm or less, or about 30 ppm or less, or about 15 ppm or less, or about 10 ppm or less, or about 5 ppm or less in the hydrogen molar content range with respect to the propylene monomer.

In the present disclosure, the propylene homopolymer as described above is prepared by the polymerization reaction, and then the ethylene propylene copolymer to be dispersed in the propylene homopolymer is prepared by the gas phase reaction, thereby preparing the polypropylene resin composition exhibiting high transparency and excellent elongation while maintaining excellent impact resistance during manufacturing of the injection molding products by optimizing the molecular weight distribution and the xylene soluble (X.S.), the content of ethylene, the melt index, and the crystallization temperature (Tc) at the same time.

Specifically, the melt index ($MI_{2.16}$) of the propylene homopolymer obtained in the first reactor may be about 10 g/10 min to about 100 g/10 min, and more specifically about 15 g/10 min to about 35 g/10 min or about 25.2 g/10 min to about 25.6 g/10 min, as measured according to the American Society for Testing and Materials ASTM D 1238 at 230° C. under a load of 2.16 kg.

In particular, the melt index ($MI_{2.16}$) of the propylene homopolymer obtained in the first reactor is obtained in the range the same as or similar to the melt index ($MI_{2.16}$) of the polypropylene resin composition finally prepared. For example, the melt index ($MI_{2.16}$) of the propylene homopolymer and the melt index ($MI_{2.16}$) of the polypropylene resin composition finally prepared may have a difference within about 5 g/10 min. Specifically, the melt index ($MI_{2.16}$) of the propylene homopolymer and the melt index ($MI_{2.16}$) of the ethylene propylene copolymer may have a difference within about 0 to about 5 g/10 min, and more specifically, a difference within about 3 g/10 min, or about 2 g/10 min, or about 1.5 g/10 min.

As described above, the propylene homopolymer obtained in the first reactor and the ethylene propylene copolymer obtained in the second reactor may also have the same or similar range of melt index ($MI_{2.16}$), viscosity, molecular weight. In the present disclosure, it is possible to prevent a rapid increase in the molecular weight of the ethylene propylene copolymer by using the continuous reactor in the presence of the metallocene compound of Formula 1, unlike those to which the existing Ziegler-Natta catalyst is applied.

The difference in the physical properties of the propylene homopolymer and the ethylene propylene copolymer may be optimized by using the continuous reactor in the presence of the metallocene compound of Formula 1, and the ethylene propylene copolymer is dispersed in the propylene homopolymer with minimized phase separation, thereby solving the problem of lowered transparency and elongation caused by phase separation of the propylene homopolymer and the ethylene propylene copolymer.

Meanwhile, in the second reactor, the propylene and the ethylene may be introduced at a weight ratio of 7:3 to 6:4, or the propylene may be introduced at a weight ratio of 1.4 times to 2.6 times the weight of the input amount of the ethylene. For example, the propylene and the ethylene may be introduced at a weight ratio of 7:3, or 6.5:4, or 6:4. Alternatively, for another example, the propylene may be introduced at a weight ratio of 1.45 times or more, or 1.5 times or more, or 1.52 times or more, or 1.55 times or more, or 1.58 times or more, or 1.6 times or more, or 1.62 times or more, and 2.5 times or less, or 2.48 times or less, or 2.45 times or less, or 2.4 times or less, or 2.38 times or less, or 2.35 times or less, or 2.34 times or less the weight of the input amount of the ethylene.

For example, in the polypropylene resin composition of the present disclosure, the amount of the ethylene propylene copolymer may be 3% by weight to 9% by weight, or 3.2% by weight to 8.8% by weight, or 3.3% by weight to 8.6% by weight, or 3.5% by weight to 8.4% by weight, or 4% by weight to 8% by weight, based on the weight of the propylene homopolymer.

Further, in the method of preparing the polypropylene resin composition, the process of preparing the propylene homopolymer and the process of preparing the ethylene propylene copolymer may be performed in the presence of the above-described catalyst composition by applying common apparatus and contact techniques.

The polypropylene resin composition according to one embodiment of the present disclosure, which is prepared by the above-described preparation method, may produce thin and uniform fibers, and may not only give a softer touch feeling than existing products, but also have high strength to realize excellent stiffness without being easily torn, by optimizing the xylene soluble, the content of ethylene, the tensile strength and the flexural modulus together with the narrow molecular weight distribution. Therefore, the polypropylene resin composition may be useful particularly for producing polypropylene nonwoven fabrics requiring high stiffness and excellent softness.

Such a polypropylene resin composition of the present disclosure may maintain high stiffness, together with excellent process stability and processability, as compared with the existing polypropylene to which the Ziegler-Natta catalyst is applied, or the existing homopolypropylene or copolymer to which the metallocene catalyst is applied, and may secure more improved softness property when producing nonwoven fabrics.

Polypropylene Nonwoven Fabric

Meanwhile, according to further another embodiment of the present disclosure, provided are a resin composition for producing nonwoven fabrics, the resin composition including the above-described polypropylene resin composition, and a polypropylene nonwoven fabric produced by using the same.

The resin composition for producing nonwoven fabrics and the nonwoven fabric produced by using the same may be prepared according to a common method, except that the above-described polypropylene resin composition is used.

For example, the polypropylene nonwoven fabric according to the present disclosure may be composed of a fiber produced from the above-described polypropylene resin composition.

As described, a series of reactors including the first reactor preparing the polypropylene homopolymer and the second reactor preparing the ethylene propylene copolymer may be used for the production. As a result, by optimizing all of the xylene soluble, the content of ethylene, the tensile strength and the flexural modulus, the melt index, and the crystallization temperature, together with the narrow molecular weight distribution, the polypropylene resin composition is advantageous in that it may maintain high strength together with excellent processability when producing polypropylene nonwoven fabrics, and may provide excellent softness, as compared to the existing products.

Specifically, the polypropylene nonwoven fabric may have a handle-O-meter of 24 g or less, or about 1.0 g to about 24 g, as measured according to the NWSP 090.3.$R_0$ standard, in terms of securing excellent flexibility together with high strength. When the measured value of handle-O-meter is maintained within the above-mentioned range, it is possible to secure excellent flexibility so that roughness of the polypropylene nonwoven fabric may be reduced and soft property may be realized. The handle-O-meter is a value measured when the basis weight of the nonwoven fabric is 72 $g/m^2$ to 76 $g/m^2$.

In particular, the polypropylene nonwoven fabric according to the present disclosure is characterized by satisfying the above range of the handle-O-meter value, and therefore, may maintain high strength and may realize soft property, as compared to the existing products.

Advantageous Effects

According to the present disclosure, it is possible to provide a polypropylene resin composition including an ethylene propylene copolymer, which is prepared by using a continuous reactor in the presence of a metallocene compound having a specific structure, and exhibits high strength together with excellent processability and softness property by simultaneously optimizing the xylene soluble, the contents of ethylene, the tensile strength, the flexural modulus, the melt index, and the crystallization temperature, together with the narrow molecular weight distribution, thereby being advantageous in producing polypropylene nonwoven fabrics.

BRIEF DESCRIPTION OF DRAWINGS

FIG. 1 shows a scanning electron microscope (SEM) image exhibiting a cross-section of a polypropylene resin composition according to Example 1-1.

FIG. 2 shows a scanning electron microscope (SEM) image exhibiting a polypropylene nonwoven fabric produced according to Example 2-1.

FIG. 3 shows a scanning electron microscope (SEM) image exhibiting a polypropylene nonwoven fabric produced according to Example 2-2.

FIG. 4 shows a scanning electron microscope (SEM) image exhibiting a polypropylene nonwoven fabric produced according to Comparative Example 2-4.

DETAILED DESCRIPTION OF THE EMBODIMENTS

Hereinafter, the actions and effects of the present invention will be described in more detail with reference to the specific exemplary embodiments of the present invention. However, these exemplary embodiments are only for illustrating the present invention, and the scope of the present invention is not limited thereto.

EXAMPLES

Preparation of Metallocene Catalyst

Preparation Example 1

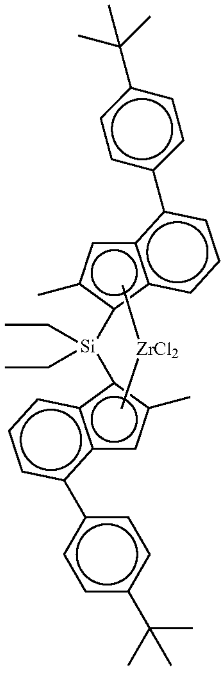

Step 1) Preparation of (diethylsilane-diyl)-bis((2-methyl-4-tert-butyl-phenylindenyl)silane 2-Methyl-4-tert-butylphenylindene (20.0 g) was dissolved in a mixed solvent of toluene and tetrahydrofuran (a volume ratio of toluene/THF: 10/1, 220 mL), and then n-butyllithium solution (2.5 M, hexane solvent, 22.2 g) was slowly added dropwise thereto at 0° C., followed by stirring at room temperature for 1 day. Then, diethyldichlorosilane (6.2 g) was slowly added dropwise to the mixed solution at −78° C., and the mixture was stirred for about 10 minutes and then stirred at room temperature for 1 day. Then, the organic layer was removed by adding water, and the solvent was distilled under reduced pressure to obtain (diethylsilane-diyl)-bis((2-methyl-4-tert-butyl-phenylindenyl)silane.

Step 2) Preparation of [(diethylsilane-diyl)-bis((2-methyl-4-tert-butyl-phenylindenyl)]zirconium Dichloride (Diethylsilane-diyl)-bis((2-methyl-4-tert-butyl-phenylindenyl)silane prepared in the step 1 was dissolved in a mixed solvent of toluene/THF=5/1 solution (120 mL), and then n-butyllithium solution (2.5 M, hexane solvent, 22.2 g) was slowly added dropwise thereto at −78° C., and the mixture was stirred at room temperature for 1 day. To the reaction solution, zirconium chloride (8.9 g) diluted with toluene (20 mL) was slowly added dropwise at −78° C., followed by stirring at room temperature for 1 day. The solvent of the reaction solution was removed under reduced pressure, dichloromethane was added and filtered, and the filtrate was removed by distillation under reduced pressure. Recrystallization was performed using toluene and hexane to obtain high-purity rac-[(diethylsilane-diyl)-bis((2-methyl-4-tert-butyl-phenylindenyl)]zirconium dichloride (10.1 g, yield: 34%, molar ratio of rac:meso=20:1).

Step 3) Preparation of Supported Catalyst 100 g of silica and 10 wt % of methylaluminoxane (670 g) were added to a 3 L reactor and reacted at 90° C. for 24 hours. After precipitation, the upper layer was eliminated and the rest was washed twice with toluene. The ansa-metallocene compound, rac-[(diethylsilane-diyl)-bis((2-methyl-4-tert-butyl-phenylindenyl)]zirconium dichloride (5.8 g) prepared in the step 2 was diluted with toluene and added to the reactor, and then the solution was reacted at 70° C. for 5 hours. When the precipitation was completed after the reaction, the solution of upper layer was eliminated and the remaining reaction product was washed with toluene and further washed with hexane, and vacuum-dried to obtain 150 g of a silica-supported metallocene catalyst in the form of solid particles.

Preparation of Polypropylene Resin Composition

Examples 1-1 and 1-2

A propylene homopolymer was prepared using the silica-supported metallocene catalyst of Preparation Example 1 under conditions shown in Table 1 below in a first reactor (a bulk-slurry process, a spheripol process, two loop reactors of 1-1 and 1-2 are included), and then the propylene homopolymer thus prepared was transported to a second reactor (gas phase reactor), and an ethylene propylene copolymer was prepared in the second reactor (gas phase reactor) under conditions shown in Table 1 to obtain a polypropylene resin composition.

In this regard, when the propylene homopolymer prepared in the first reactor was transported to the second reactor (gas phase reactor) as described above, the prepared propylene homopolymer was transported to the second reactor without separate treatment with an antistatic agent, together with the unreacted propylene monomer and hydrogen gas after the first recovery process in the first reactor. Further, the ethylene propylene copolymer dispersed in the propylene homopolymer was prepared in the second reactor through a gas reaction process by introducing no additional hydrogen gas or by introducing a trace amount of hydrogen (about 10 ppm or less) in the presence of hydrogen gas transported together with the propylene homopolymer and in the presence of the silica-supported metallocene catalyst of Preparation Example 1 in the catalyst composition.

Further, the polypropylene resin compositions of Examples 1 to 4 include only the propylene homopolymer and the ethylene propylene copolymer obtained as above, and include no additives such as a nucleating agent, etc. Specifically, in the polypropylene resin composition, the content of the ethylene propylene copolymer was 4% by weight to 8% by weight (propylene homopolymer:ethylene propylene copolymer=4-8:1), based on the weight of the propylene homopolymer.

For reference, the type of the supported catalyst used in each Example, the polymerization pressure and temperature of each reactor, the concentration of hydrogen gas introduced to each reactor, or the concentration of cocatalyst (TEAL), and the input amounts of ethylene gas and propylene gas are summarized in Table 1 below.

Comparative Example 1-1

A polypropylene resin composition of Comparative Example 1-1 was prepared in the same manner as in Example 1-1, except that the polymerization process was performed using a supported catalyst of rac-[(6-t-butoxyhexylmethylsilanediyl)-bis(2-methyl-4-(4-t-butylphenyl)indenyl)]hafnium dichloride which is a compound represented by the following Formula A, instead of the metallocene compound [(diethylsilane-diyl)-bis((2-methyl-4-tert-butylphenylindenyl)]zirconium dichloride of Preparation Example 1.

[Formula A]

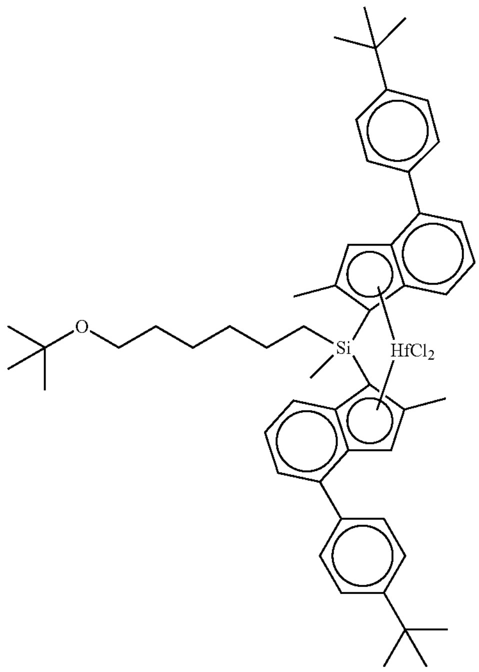

Comparative Example 1-2

A polypropylene resin composition of Comparative Example 1-2 was prepared in the same manner as in Example 1-1, except that the polymerization process was performed using a supported catalyst of rac-[(dimethylsilanediyl)-(2-methyl-4-phenylindenyl)(2-methyl-4-phenyl-5-methoxy-6-t-butyl)]zirconium dichloride which is a compound represented by the following Formula B, instead of the metallocene compound [(diethylsilane-diyl)-bis((2-methyl-4-tert-butyl-phenylindenyl)]zirconium dichloride of Preparation Example 1.

[Formula B]

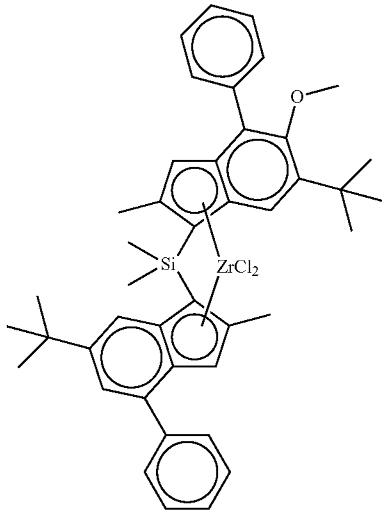

For reference, the type of the supported catalyst used in each Example, the polymerization pressure and temperature of each reactor, the concentration of hydrogen gas introduced to each reactor, or the concentration of cocatalyst (TEAL), and the input amounts of ethylene gas and propylene gas are summarized in Table 1 below.

TABLE 1

| | | | Homopolymerization process of first reactor | | | | | Copolymerization process of second reactor | | | |
|---|---|---|---|---|---|---|---|---|---|---|---|
| | Catalyst | Input amount of catalyst (g/hr) | Polymerization pressure ($kg/cm^2$) | Polymerization temperature (° C) | Input amount of C3 (kg/hr) | Input amount of TEAL (ppm) | Input amount of $H_2$ (ppm) | Polymerization pressure ($kg/cm^2$) | Polymerization temperature (° C) | Input amount of C3 (kg/hr) | Input amount of C2 (kg/hr |
| Example 1-1 | Preparation Example 1 | 1.3 | 35 | 67 | 80 | 50 | 430 | 18 | 72 | 7.0 | 3.0 |
| Example 1-2 | Preparation Example 1 | 1.3 | 35 | 67 | 80 | 50 | 430 | 18 | 72 | 6.5 | 4.0 |
| Comparative Example 1-1 | Formula A | 1.8 | 35 | 70 | 80 | 50 | 350 | 18 | 72 | 6.5 | 4.0 |
| Comparative Example 1-2 | Formula B | 2.4 | 35 | 70 | 80 | 50 | 430 | 18 | 72 | 6.5 | 4.0 |

In Table 1, the input amounts of TEAL and $H_2$ are molar content values (ppm), based on the input amount of propylene.

Comparative Example 1-3

A propylene homopolymer (Homo PP, a product of LG Chem Ltd., H7700, $MI_{2.16}$ of 34 g/10 min) and an ethylene propylene elastomer (C3 POE, Exxon Vistamaxx 6202, $MI_{2.16}$ of 20 g/10 min) were mixed such that the content of the elastomer was 15% by weight, based on the total weight of the entire composition, thereby preparing a polypropylene resin composition [Homo PP+C3 POE (15%)] of Comparative Example 1-3.

Comparative Example 1-4

A propylene homopolymer (Homo PP, a product of LG Chem Ltd., H7700, $MI_{2.16}$ of 34 g/10 min) and an ethylene propylene elastomer (C3 POE, Exxon Vistamaxx 6202, $MI_{2.16}$ of 20 g/10 min) were mixed such that the content of the elastomer was 20% by weight, based on the total weight of the entire composition, thereby preparing a polypropylene resin composition [Homo+C3 POE (20%)] of Comparative Example 1-4.

Comparative Example 1-5

To the polypropylene resin composition previously prepared as in Comparative Example 1-2, a phosphate metal salt-based nucleating agent was further added in an amount of 200 ppm, based on the total weight of the resin composition, and prepared as a polypropylene resin composition of Comparative Example 1-5.

Test Example 1

Physical properties of the polypropylene resin compositions of Examples 1-1 to 1-2 and Comparative Examples 1-1 to 1-5 were evaluated by the following methods.

(1) Melt Index (MI)

The melt index was measured at 230° C. under a load of 2.16 kg according to the American Society for Testing and Materials (ASTM) D1238, and expressed as the weight (g) of the polymer obtained by melting for 10 minutes.

(2) Content of Ethylene (C2, wt %)

The contents of ethylene in the polypropylene resin compositions of Examples 1-1 to 1-2 and Comparative Examples 1-1 to 1-5 were measured by infrared spectroscopy according to the American Society for Testing and Materials (ASTM) 5576 standard.

In detail, the polypropylene resin compositions of Examples 1-1 to 1-2 and Comparative Examples 1-1 to 1-5 were prepared in the form of a film or film specimen, and then fixed on a magnetic holder of an FT-IR instrument. Next, the height of 4800-3500 $cm^{-1}$ peak reflecting the thickness of the specimen and the area of 750-710 $cm^{-1}$ peak indicating the ethylene component at IR absorption spectrum were measured and calculated. The contents of ethylene are calculated by putting the measured values into a calibration formula which is obtained by plotting values obtained by dividing the 750-710 $cm^{-1}$ peak area of the standard sample by the peak height of 4800-3500 cm-1, according to the American Society for Testing and Materials (ASTM) D 5576 method, respectively.

(3) Xylene Soluble (X.S, wt %)

200 mL of xylene was added to 2 g of each sample of the polypropylene resin compositions of Examples 1-1 to 1-4 and Comparative Examples 1-1 to 1-5, and heated to 130° C. for 1 hour or more to completely dissolve the composition, and then cooled at 20° C. for 1 hour or more, followed by filtration. Thus, solid and liquid phases were separated. Thereafter, the liquid phase was heated to 130° C. to remove xylene components. Then, the weight of the remaining components was measured.

(4) Melting Temperature (Tm)

The melting point and melting temperature (Tm) of the polypropylene resin compositions of Examples 1-1 to 1-2 and Comparative Examples 1-1 to 1-5 were measured using a differential scanning calorimeter (DSC, device name: DSC 2920, manufacturer: TA Instrument) according to the American Society for Testing and Materials (ASTM) D 3418 standard.

In detail, the polypropylene resin composition was heated up to 200° C. by increasing the temperature, and maintained at that temperature for 5 minutes ($1^{st}$ RUN thermal history elimination). Then, the temperature was cooled to −30° C. and again allowed to increase. The temperature at the top of the DSC (differential scanning calorimeter manufactured by TA instrument) curve was referred to as the melting point (Tm). Herein, the temperature was increased and decreased at a rate of 10° C./min, respectively, and the melting temperature (Tm) is represented by the results measured at the second heating, cooling period ($2^{nd}$ RUN).

(5) Crystallization Temperature (Tc)

The temperature was decreased under the same conditions as in the measurement of the melting temperature using DSC according to the American Society for Testing and Materials (ASTM) D 3418 standard, and the temperature at the top of the DSC (differential scanning calorimeter manufactured by TA instrument) curve was measured as the crystallization temperature (Tc).

(6) Molecular Weight Distribution (MWD, Polydispersity Index)

The molecular weight distribution (MWD) was determined by measuring the weight average molecular weight (Mw) and the number average molecular weight (Mn) of the copolymer using gel permeation chromatography (GPC, manufactured by Water), and then dividing the weight average molecular weight by the number average molecular weight.

In detail, Waters PL-GPC220 instrument was used as a gel permeation chromatography (GPC) instrument, and Polymer Laboratories' PLgel MIX-B column having a length of 300 mm was used. At this time, the measurement temperature was 160° C., 1,2,4-trichlorobenzene was used as a solvent, and a flow rate of 1 mL/min was applied. Samples of the polypropylene resin compositions of Examples 1-1 to 1-2 and Comparative Examples 1-1 to 1-5 were pre-treated by dissolving in 1,2,4-trichlorobenzene containing 0.0125% BHT at 160° C. for 10 hours using the GPC analyzer (PL-GP220), respectively and prepared at a concentration of 10 mg/10 mL. Then, 200 μL thereof was fed. A calibration curve obtained with polystyrene standards was used to determine the values of Mw and Mn. 9 kinds of polystyrene standard specimens having a weight average molecular weight of 2000 g/mol, 10000 g/mol, 30000 g/mol, 70000 g/mol, 200000 g/mol, 700000 g/mol, 2000000 g/mol, 4000000 g/mol, 10000000 g/mol was used.

(7) Tensile Strength

The tensile strength ($kg/cm^2$) of the polypropylene resin composition was measured using a universal testing machine (UTM, manufactured by Instron) according to the American Society for Testing and Materials (ASTM) D 638.

(8) Flexural Strength and Flexural Modulus

The flexural strength ($kg/cm^2$) and flexural modulus ($kg/cm^2$) of the polypropylene resin compositions were measured according to the American Society for Testing and Materials (ASTM) D 790.

In detail, the specimen prepared according to ASTM standard D790 was laid and fixed to a support, and then the strength ($kg/cm^2$) required when a load of 28 mm/min was applied by loading nose was measured. The flexural modulus indicating stiffness was measured by an initial slope value according to the flexural strength, which is a maximum value at which the loading nose no longer increases, and the flexural force.

The results of evaluating the physical properties of the polypropylene resin compositions of Examples 1-1 to 1-2 and Comparative Examples 1-1 to 1-5, which were measured by the above-described methods, are shown in Table 2 below.

<Production of Nonwoven Fabric>

Example 2-1

A polypropylene nonwoven fabric was produced using the polypropylene resin composition obtained from Example 1-1 under the following spinning equipment and conditions.

<Spinning Equipment and Conditions>

Spinning equipment: name, Fiberio Cyclone™ L-1000

Spinning conditions: Temp. 310° C./Nozzle Size 600 μm/13000 RPM

Example 2-2

A polypropylene nonwoven fabric was produced in the same manner as in Example 2-1, except that the polypropylene resin composition obtained from Example 1-2 was used.

TABLE 2

| | Example 1-1 | Example 1-2 | Comparative Example 1-1 | Comparative Example 1-2 | Comparative Example 1-3 | Comparative Example 1-4 | Comparative Example 1-5 |
|---|---|---|---|---|---|---|---|
| MI (2.16 kg, g/10 min) | 25.2 | 25.6 | 26.2 | 32.6 | 34/20 | 34/20 | 32.6 |
| C2 content (wt %) | 2.2 | 2.7 | 2.5 | 5.6 | 2.5 | 3.0 | 5.6 |
| X.S (%) | 4.5 | 7.0 | 7.0 | 12.2 | Not measurable | Not measurable | 12.2 |
| Tm (° C.) | 152 | 152 | 149 | 153 | 159 | 159 | 154 |
| Tc (° C.) | 111 | 110 | 105 | 108 | 109 | 109 | 121 |
| Mw/Mn | 2.8 | 2.8 | 3.4 | 3.0 | 3.0 | 3.0 | 3.0 |
| Tensile strength ($kg/cm^2$) | 280 | 280 | 260 | 260 | 250 | 250 | 275 |
| Flexural strength ($kg/cm^2$) | 380 | 380 | 350 | 350 | 350 | 340 | 370 |
| Flexural modulus ($kg/cm^2$) | 12000 | 12000 | 11000 | 10500 | 11000 | 10500 | 12500 |

Further, to examine dispersibility of the ethylene propylene copolymer in the homopolypropylene matrix with regard to the polypropylene resin compositions of Examples 1-1 and 1-2, the cross-section of each polypropylene resin composition was observed by scanning electron microscopy (SEM). In detail, a scanning electron microscope (SEM) image showing the cross-section of the polypropylene resin composition of Example 1-1 is shown in FIG. 1 (3000 times magnification). Here, the polypropylene resin composition of Example 1-1 had high dispersibility by minimizing the phase separation between the homopolypropylene matrix and the ethylene propylene copolymer and had remarkably improved softness, together with excellent elongation property and processability.

As shown in Table 2, the polypropylene resin compositions of Examples 1-1 and 1-2 including the ethylene propylene copolymer, which was prepared by using the continuous reactor in the presence of the metallocene compound having the specific structure according to the present disclosure, exhibited high tensile strength and flexural modulus together with the narrow molecular weight distribution and the optimized xylene soluble (X.S) and had excellent elongation property and processability together with improved softness, as compared with the polypropylene resin compositions of Comparative Examples 1-1 to 1-4.

Comparative Examples 2-1 to 2-4

Each polypropylene nonwoven fabric was produced in the same manner as in Example 2-1, except that the polypropylene C3-Elastomer 15% and 20% Blend products of Comparative Examples 1-1 to 1-4 were used, respectively.

Comparative Example 2-5

A polypropylene nonwoven fabric was produced in the same manner as in Example 2-1, except that the polypropylene resin composition of Comparative Example 1-5 was used. However, a single yarn problem occurred, and thus spinning was impossible.

Test Example 2

Physical properties of the polypropylene nonwoven fabrics of Examples 2-1 to 2-2 and Comparative Examples 2-1 to 2-4 were evaluated by the following methods, and the results are shown in Table 3 below.

(1) Weight of Nonwoven Fabric

The weight of the produced nonwoven fabric was measured, and the weight of the nonwoven fabric per unit area ($g/m^2$) was calculated.

(2) Mean Diameter of Individual Fiber of Nonwoven Fabric

The mean diameter (fiber diameter, μm) of the fibers constituting the nonwoven fabric was obtained by measuring 400 samples of the nonwoven fabric using a scanning electron microscope (SEM).

(3) Softness of Nonwoven Fabric

Flexibility (softness, HOM; Total Hand, g) of the nonwoven fabric was measured using Thwing-Albert Instrument's handle-O-meter machine. The handle-O-meter value used herein has an error of +25% to −25%, which is a known deviation from the manufacturer.

TABLE 3

| | Example 2-1 | Example 2-2 | Comparative Example 2-1 | Comparative Example 2-2 | Comparative Example 2-3 | Comparative Example 2-4 | Comparative Example 2-5 |
|---|---|---|---|---|---|---|---|
| Weight of nonwoven fabric ($g/m^2$) | 72 | 75 | Not measurable (Poor spinning) | 76 | 76 | 74 | Not measurable (Poor spinning) |
| Strength of individual fiber (g/d) | 5.5 | 5.1 | Not measurable (Poor spinning) | 3.5 | 4.5 | 4 | Not measurable (Poor spinning) |
| Mean diameter of individual fiber (μm) | 8.5 | 8.6 | Not measurable (Poor spinning) | 9.2 | 11.6 | 10.6 | Not measurable (Poor spinning) |
| Handle-O-Meter (g) | 24 | 21 | Not measurable (Poor spinning) | 18 | 32 | 28 | Not measurable (Poor spinning) |

As shown in Table 3, Examples of the present disclosure had low handle-O-meter to exhibit excellent softness by thinning (thin fibers), as compared to Comparative Examples.

Further, scanning electron microscope (SEM) images of the nonwoven fabrics of Examples 2-1 and 2-2, and Comparative Example 2-4 are shown in FIGS. 2, 3, and 4. As compared with FIGS. 2, 3, and 4, the nonwoven fabrics of Examples 2-1 and 2-2 exhibited the significantly thin fiber diameter, as compared with the nonwoven fabric of Comparative Example 2-4, indicating that softness of the nonwoven fabrics may be remarkably improved.

Furthermore, as described above, Comparative Example 2-1 had a problem that it is difficult to measure physical properties of the nonwoven fabric because of poor spinning due to the broad molecular weight distribution of the polypropylene composition. Further, Comparative Example 2-2 showed greatly reduced fiber strength even though the xylene soluble (X.S) of the polypropylene composition was increased and the mean diameter of the fibers of the nonwoven fabric was increased. In contrast, Comparative Example 2-5 had a problem that it is difficult to measure physical properties of the nonwoven fabric because crystallinity of the polypropylene composition was increased, and the high crystallization temperature (Tc) caused rapid solidification to generate high stress on the filament during spinning, leading to generation of single yarns, and thus spinning was impossible.

The invention claimed is:

1. A polypropylene resin composition having:

a molecular weight distribution (Mw/Mn) of 2.6 to 3.2, a xylene soluble (X.S.) of 4.5% by weight to 7.5% by weight, a content of ethylene of 1.0% by weight to 5.0% by weight, a tensile strength of 275 $kg/cm^2$ to 285 $kg/cm^2$, as measured according to the ASTM D 638 method, a flexural modulus of 11500 $kg/cm^2$ to 12500 $kg/cm^2$, as measured according to the ASTM D 790 method, a melt index ($MI_{2.16}$, measured according to the ASTM D 1238 at 230° C. under a load of 2.16 kg) of 10 g/10 min to 45 g/10 min, and a crystallization temperature (Tc) of 95° C. to 115° C., wherein the polypropylene resin composition comprises a propylene homopolymer and an ethylene propylene copolymer, wherein the ethylene propylene copolymer is dispersed in the propylene homopolymer.

2. The polypropylene resin composition of claim 1, wherein the molecular weight distribution (Mw/Mn) is 2.6 to 2.8.

3. The polypropylene resin composition of claim 1, wherein the xylene soluble (X.S.) is 4.5% by weight to 7.0% by weight.

4. The polypropylene resin composition of claim 1, wherein the content of ethylene is 2.0% by weight to 3.2% by weight.

5. The polypropylene resin composition of claim 1, wherein the tensile strength is 278 $kg/cm^2$ to 283 $kg/cm^2$, as measured according to the ASTM D 638 method.

6. The polypropylene resin composition of claim 1, wherein the flexural modulus is 11800 $kg/cm^2$ to 12300 $kg/cm^2$, as measured according to the ASTM D 790 method.

7. The polypropylene resin composition of claim 1, wherein the melt index ($MI_{2.16}$, measured according to ASTM D 1238 at 230° C. under a load of 2.16 kg) is 20 g/10 min to 45 g/10 min.

8. The polypropylene resin composition of claim 1, wherein the crystallization temperature (Tc) is 108° C. to 112° C.

9. The polypropylene resin composition of claim 1, which has a melting temperature of 150° C. to 158° C.

10. A polypropylene nonwoven fabric composed of a fiber produced from the polypropylene resin composition of claim 1.

11. The polypropylene nonwoven fabric of claim 10, which has a mean diameter of the fiber of 5.7 micrometers to 8.6 micrometers.

12. The polypropylene nonwoven fabric of claim 10, which has a handle-O-meter of 24 g or less, as measured according to the NWSP 090.3.R0 standard when a basis weight of the nonwoven fabric is 72 $g/m^2$ to 76 $g/m^2$.

13. The polypropylene resin composition of claim 1, which has a flexural strength of 375 $kg/cm^2$ to 385 kg/cm, as measured according to the ASTM D 790 method.

14. The polypropylene resin composition of claim 1, which does not include a nucleating agent.

15. The polypropylene resin composition of claim 1, wherein the ethylene propylene copolymer is 3% by weight to 9% by weight, based on a total weight of the propylene homopolymer.

* * * * *